(12) United States Patent
Freed et al.

(10) Patent No.: US 10,051,772 B2
(45) Date of Patent: Aug. 21, 2018

(54) DEBRIS CLEARING DEVICE HAVING TEETH WITH SHARPENED LEADING EDGES

(71) Applicants: Brian E. Freed, Lexington, IL (US); Bruce Freed, Lexington, IL (US)

(72) Inventors: Brian E. Freed, Lexington, IL (US); Bruce Freed, Lexington, IL (US)

(*) Notice: Subject to any disclaimer, the term of this patent is extended or adjusted under 35 U.S.C. 154(b) by 0 days.

(21) Appl. No.: 14/789,882

(22) Filed: Jul. 1, 2015

(65) Prior Publication Data
US 2017/0000001 A1    Jan. 5, 2017

(51) Int. Cl.
*A01B 35/28*    (2006.01)

(52) U.S. Cl.
CPC ................... *A01B 35/28* (2013.01)

(58) Field of Classification Search
CPC ............................ A01B 33/103; A01B 35/28
USPC ......................... 172/540, 555, 604; 111/140
See application file for complete search history.

(56) References Cited

U.S. PATENT DOCUMENTS

| | | | | |
|---|---|---|---|---|
| 1,873,128 A * | 8/1932 | Johnson | ................. | A01C 5/062 111/140 |
| 2,161,714 A * | 6/1939 | Lindelof | ................ | A01B 15/18 172/515 |
| 3,681,903 A * | 8/1972 | Phillips | ................. | A01D 34/73 172/555 |
| 4,043,404 A * | 8/1977 | Sorlie | ................... | A01B 49/06 111/134 |
| 4,047,576 A * | 9/1977 | Rau | ...................... | A01B 29/041 172/120 |
| 5,346,020 A * | 9/1994 | Bassett | ................. | A01B 35/16 172/540 |
| 5,497,717 A * | 3/1996 | Martin | ................... | A01C 5/066 111/140 |
| 5,497,836 A * | 3/1996 | Groff | .................... | A01C 7/006 172/555 |
| 5,620,055 A * | 4/1997 | Javerlhac | .............. | A01B 15/16 172/532 |
| 7,240,627 B1 * | 7/2007 | Whalen | ................. | A01C 5/066 111/140 |
| 2007/0029100 A1 * | 2/2007 | Tschetter | .............. | A01B 71/04 172/680 |

* cited by examiner

*Primary Examiner* — Thomas B Will
*Assistant Examiner* — Joel F. Mitchell
(74) *Attorney, Agent, or Firm* — William H. Honaker; Dickinson Wright PLLC (57) ABSTRACT

A debris clearing apparatus for use with an agricultural implement has a pair of rotatable discs each having a plurality of teeth extending from a periphery thereof. The teeth on the discs each have a profile comprising a leading edge and a trailing edge. The leading edges are sharpened to create cutting edges to cut through crop residue and other debris. The leading cutting edge can be a straight edge with an outer edge formed at the distal tip of the tooth between the leading and trailing edges. Alternatively, the leading cutting edge can be a curved edge with a sharp outer point between the leading and trailing edges. The discs are arranged so that geometric planes containing the first and second discs intersect and the discs are toed-in toward each other relative to a direction of travel of the implement.

26 Claims, 10 Drawing Sheets

DEBRIS CLEARING DEVICE HAVING TEETH WITH SHARPENED LEADING EDGES

BACKGROUND OF THE INVENTION

Field of the Invention

The present invention relates generally to methods and devices for clearing crop debris for use with planters and other agricultural implements. In particular, the present invention relates to a crop clearing apparatus that uses a pair of rotatable discs with a plurality of teeth to clear debris.

Description of the Related Art

Crop debris clearing devices for use with planters and other agricultural implements are known in the prior art. For example, U.S. Pat. Nos. 7,240,627 and 7,832,345 issued to Whalen et al. disclose debris clearing discs that have sharpened outer edges. However, Whalen et al.'s debris clearing discs do not include sharpened leading edges and other features that have been incorporated into the Applicant's invention to improve the ability of the discs to clear debris and cut residue in the soil.

There is a need in the industry for an improved crop debris clearing apparatus for use with agricultural implements.

SUMMARY OF THE INVENTION

An object of the present invention is to provide a debris clearing apparatus that has improved ability to clear debris and cut residue in the soil during operation.

A further object of the present invention is to provide a debris clearing apparatus that uses rotatable discs with a plurality of teeth extending from a periphery thereof and sharpened leading edges on the teeth to improve the cutting and clearing action of the teeth.

A further object of the present invention is to provide an improved debris clearing apparatus for use with agricultural implements that provides superior performance, is efficient to manufacture, durable, easy to use, and capable of a long operating life.

To accomplish these and other objects of the invention, a debris clearing apparatus is provided for use with an agricultural implement. The apparatus has a pair of rotatable discs each having a first side and an opposing second side, and each disc including a plurality of teeth extending from a periphery thereof. The teeth on the discs each have a profile comprising a leading edge and a trailing edge. The leading edges are sharpened to create cutting edges to cut through crop residue and other debris. The leading cutting edge can be a straight edge with an outer edge formed at the distal tip of the tooth between the leading and trailing edges. Alternatively, the leading cutting edge can be a curved edge with a sharp outer point between the leading and trailing edges. The discs are arranged so that geometric planes containing the first and second discs intersect and the discs are toed-in toward each other relative to a direction of travel of the implement.

According to one aspect of the present invention, a debris clearing apparatus is provided for use with an agricultural implement, the apparatus comprising: one or more rotatable discs, each disc including a plurality of teeth extending from a periphery thereof, each tooth having a profile comprising a leading edge and a trailing edge; and the leading edge of each tooth being sharpened to create a leading cutting edge.

According to another aspect of the present invention, a debris clearing device is provided, comprising: a rotatable disc having a plurality of teeth extending from a periphery of the disc, each tooth having a profile comprising a leading edge and a trailing edge; and the leading edge of each tooth being sharpened to create a leading cutting edge.

Numerous other objects of the present invention will be apparent to those skilled in this art from the following description wherein there is shown and described example embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A debris clearing apparatus according to the present invention will now be described in detail with reference to FIGS. 1 to 27 of the accompanying drawings.

Figure 1:
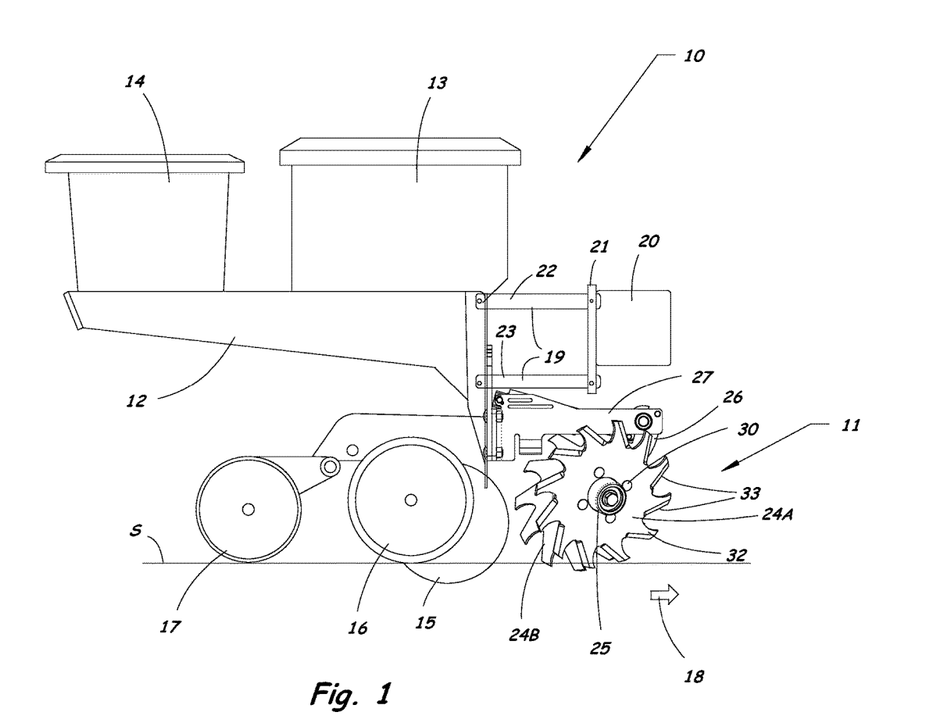
FIG. 1 is a right side elevation view of a planter row unit equipped with a debris clearing apparatus of the present invention.

Referring to FIG. 1, there is shown a side elevation view of a conventional planter row unit 10 to which is directly mounted a debris clearing apparatus 11 in accordance with an embodiment of the present invention. The planter unit 10 may include many elements, but for purposes of describing the present invention, the planter unit 10 is shown as including a frame 12 to which are mounted a seed hopper 13, an insecticide hopper 14, and plural ground engaging members. The illustrated ground engaging members include a pair of laterally spaced furrow opening discs (where one disc is shown as element 15), plural gauge wheels (where one gauge wheel is shown as element 16), and a trailing furrow closing wheel 17. All of the aforementioned ground engaging members 15, 16, 17 either ride on the surface of the soil S, or penetrate the soil S as part of the seed planting operation. The planter unit 10 is shown as traveling in the direction of arrow 18 during operation.

Attached to a forward portion of the planter unit's frame 12 is a pivoting parallel linkage arrangement 19 for facilitating mounting of the planter row unit 10 to the tool bar 20 of an agricultural implement. The planter unit 10 is coupled to the tool bar 20 by means of the pivoting parallel linkage arrangement 19 and a mounting plate 21. The mounting plate 21 is secured to an aft surface of the tool bar 20 by conventional couplers, such as U-bolts (not shown in the figure for simplicity). The parallel linkage arrangement 19 includes links 22, 23 pivotally coupled at their respective aft ends to a forward portion of the planter row unit's frame 12 and at their respective forward ends to the mounting plate 21 to allow for vertical displacement between the tool bar 20 and the planter row unit 10.

Attached to a forward portion of the planter row unit's frame 12 is the debris clearing apparatus 11. The debris clearing apparatus 11 can be mounted to the frame 12 in the manner disclosed in Applicant's U.S. Pat. No. 8,393,407, which is incorporated herein by reference. The debris clearing apparatus 11 can also be used with other agricultural implements, such as fertilizer applicators, strip till machines, seeders, and soil testing implements, and the configuration of the mounting brackets used to attach the apparatus to such implements will vary depending on the particular implement.

Figure 2:
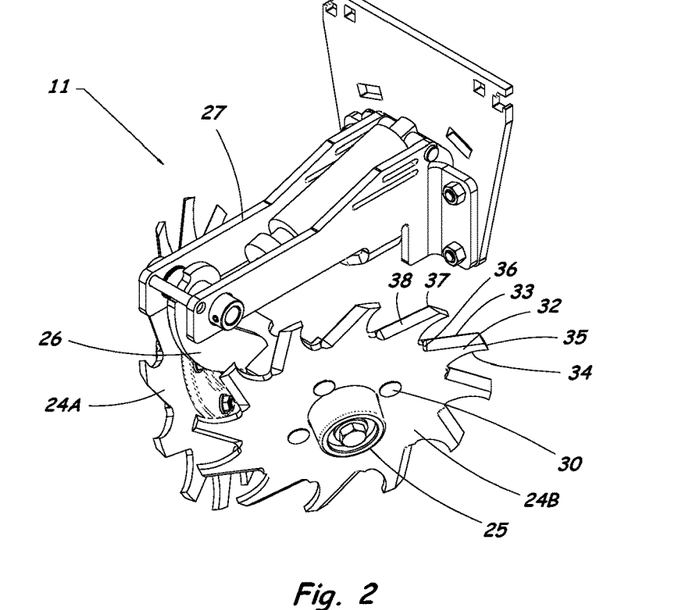
FIG. 2 is a perspective view of the debris clearing apparatus shown in FIG. 1.
Figure 3:
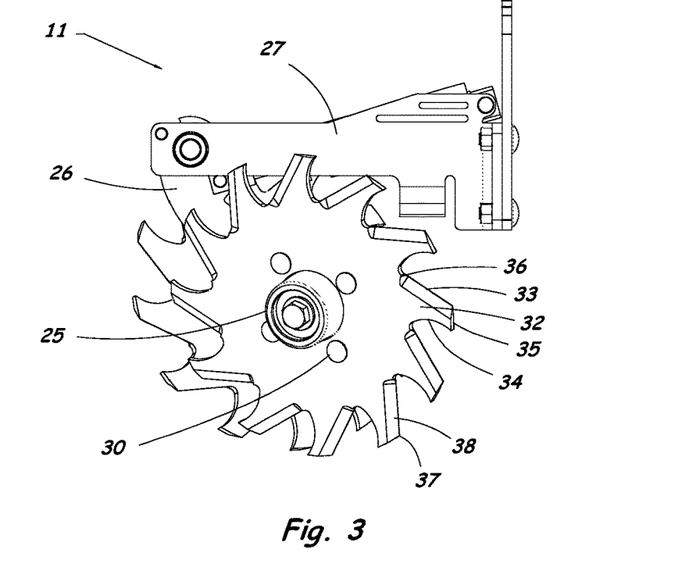
FIG. 3 is a left side elevation view of the debris clearing apparatus shown in FIG. 2.

The debris clearing apparatus 11 includes a pair of substantially flat discs 24A, 24B that are rotatably mounted via a hub 25 to a bracket arm 26 attached to a mounting bracket 27 on the implement. The discs 24A, 24B have a center hole 28 for receiving the hub 25 and a plurality of mounting holes 29 for receiving mounting bolts 30. The discs 24A, 24B are mounted to the bracket arm 26 for rotation about generally horizontal axes with the discs 24A, 24B toed-in toward each other relative to a direction of travel 18 of the implement. In this mounting arrangement, a geometric plane containing the first disc 24A intersects a geometric plane containing the second disc 24B.

The flat discs 24A, 24B each have a first side and an opposing second side. A plurality of teeth 32 extend from a periphery of each disc 24A, 24B. In the illustrated embodiment, each disc 24A, 24B has 12 teeth equally spaced around the disc at 30-degree intervals.

Figure 4:
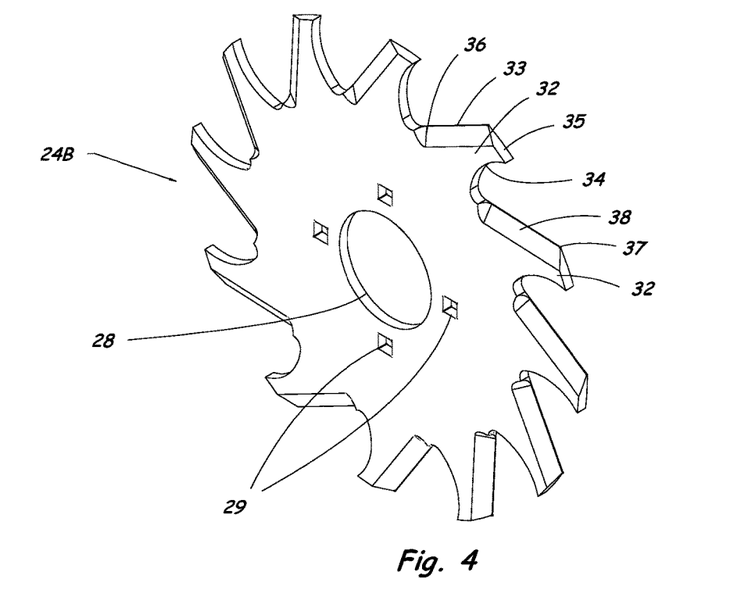
FIG. 4 is a perspective view of a left hand disc of the debris clearing apparatus shown in FIG. 2.
Figure 7:
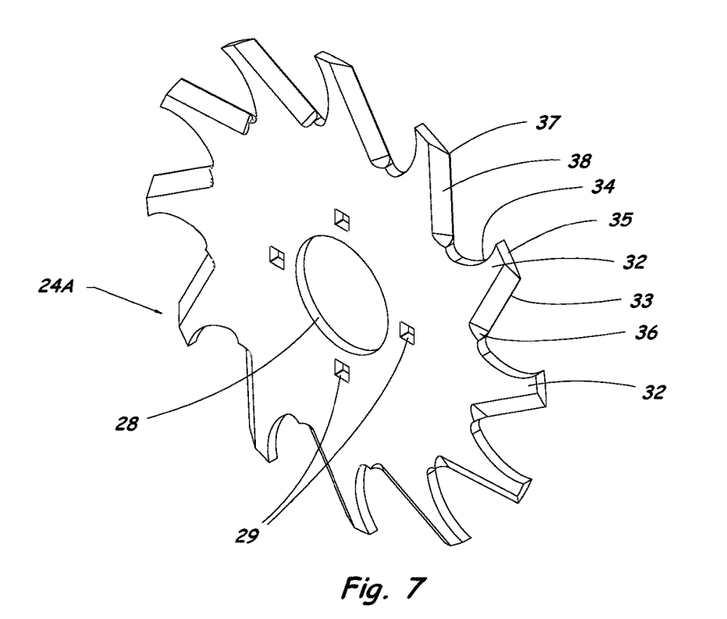
FIG. 7 is a perspective view of a right hand disc of the debris clearing apparatus shown in FIG. 2.

It will be understood that the discs 24A, 24B are basically the same as each other, except that the beveled surfaces of the teeth (described below) are formed on the opposite side of the disc 24A as compared to disc 24B. Accordingly, the discs 24A, 24B will be described interchangeably herein by simply referring to them as discs 24.

Figure 5:
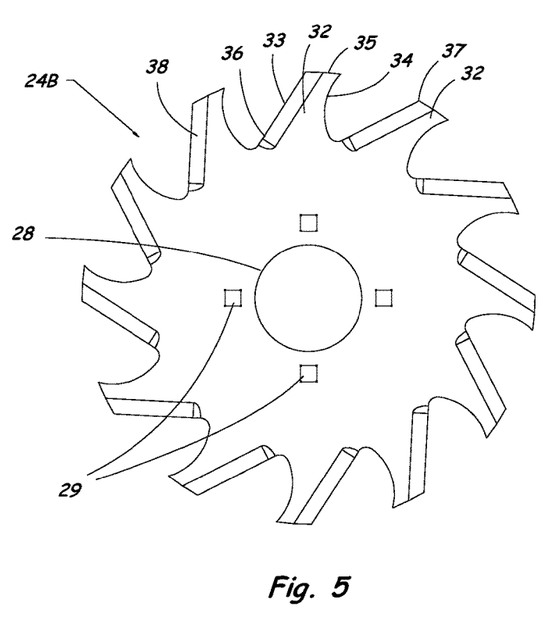
FIG. 5 is a plan view of the left hand disc shown in FIG. 4.
Figure 6:
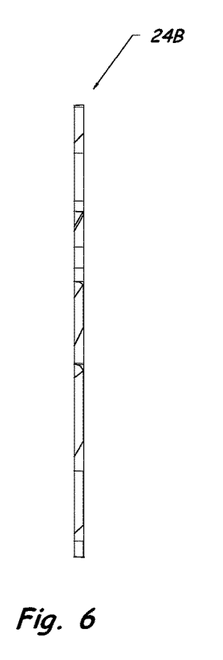
FIG. 6 is an edge view of the left hand disc shown in FIG. 4.
Figure 8:
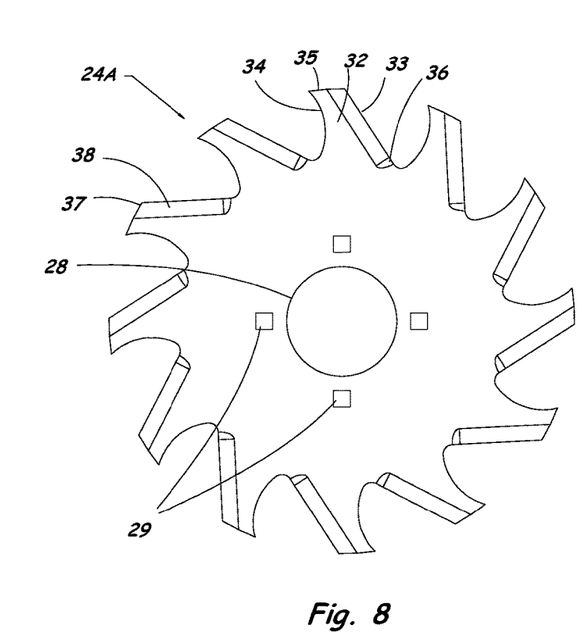
FIG. 8 is a plan view of the right hand disc shown in FIG. 7.
Figure 9:
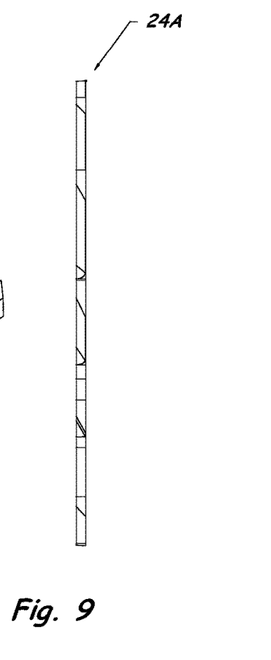
FIG. 9 is an edge view of the right hand disc shown in FIG. 7.

The teeth 32 on the discs 24 each have a profile comprising a straight leading edge 33, a concave trailing edge 34, and an outer edge 35 extending between respective outer ends of the leading edge 33 and the trailing edge 34. The leading edge 33 of each tooth 32 is sharpened to create a leading cutting edge. By having the leading edge 33 sharpened, the teeth 32 will efficiently and effectively cut crop residue and other debris at any depth of operation up to the base 36 of the teeth 32.

The outer edges 35 of the teeth 32 are substantially circumferential with the disc 24. That is, the outer edges 35 have a radius of curvature that is substantially equal to a radius of the disc 24. The outer edges 35 lie in and define the outer path of rotation of the disc 24.

The outer edges 35 extend at an obtuse angle relative to the corresponding leading edges 33 of the tooth 32. More precisely, a tangent to the outer edge 35 at the point of intersection between the leading edge 33 and outer edge 35 forms an obtuse angle relative to the leading edge 33. For example, the outer edge 35 (or more precisely a tangent to the curved outer edge 35) in the illustrated embodiment extends at an angle of approximately 120 degrees relative to the adjacent leading edge 33.

A sharp point 37 is formed at the abrupt transition where the leading cutting edge 33 of each tooth 32 intersects with the outer edge 35 thereof. This point 37 can also be described as a convex vertex formed at the intersection between the leading cutting edge 33 and the outer edge 35 of each tooth 32. The sharp point 37 between the leading and outer edges 33, 35 provides an aggressive cutting and clearing action and residue movement during operation, particularly at higher operating speeds.

The leading edges 33 of the teeth 32 in the embodiment shown in FIGS. 4 to 9 are sharpened by beveling from only one side of the disc 24. The leading edges 33 can be beveled, for example, at an angle of approximately 30 to 60 degrees relative to a plane of the disc 24. The beveled surfaces 38 are preferably on the side of the discs 24 facing away from each other.

The leading edges 33 of each tooth 32 slope rearwardly relative to a direction of rotation of the discs 24. The rearward slope of the leading edges 33 has been determined to improve the ability of the tooth 32 to cut through crop residue and other debris. The concave shape of the trailing edges 34 of the teeth 32 encourages the crop residue and soil to fall off of the teeth 32 during operation.

Figure 10:
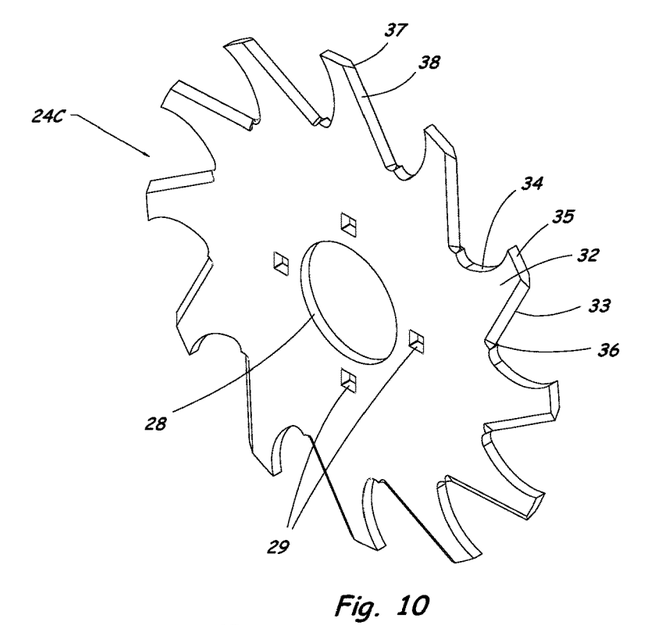
FIG. 10 is a perspective view of a double-edged disc that can be used in the debris clearing apparatus shown in FIG. 2.
Figure 11:
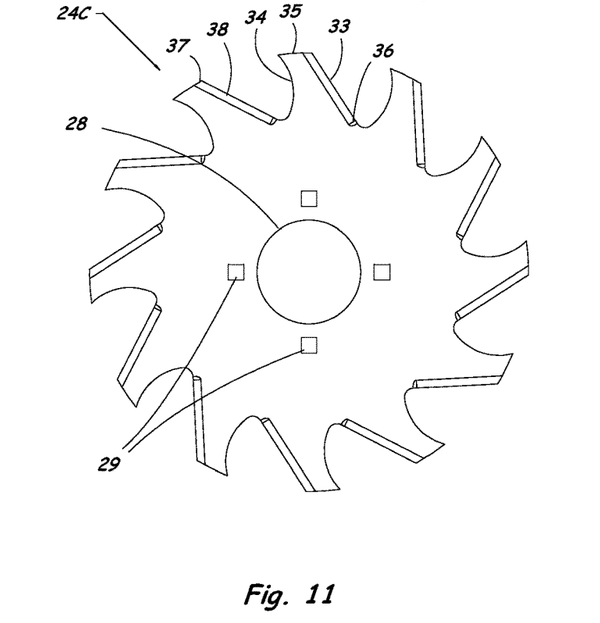
FIG. 11 is a plan view of the double-edged disc shown in FIG. 10.
Figure 12:
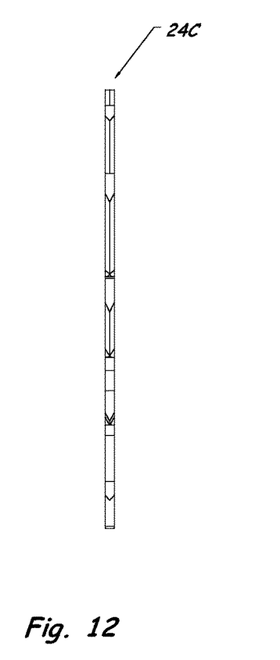
FIG. 12 is an edge view of the double-edged disc shown in FIG. 10.

FIGS. 10 to 12 show a double-edged disc 24C that can be use instead of the discs 24A, 24B in the debris clearing apparatus. The leading edges 33 of the teeth 32 of the double-edged disc 24C are sharpened by beveling from two sides of the disc 24C. The leading edges 33 can be beveled, for example, from both sides of the disc 24C at an angle of approximately 30 to 60 degrees relative to a plane of the disc 24C. By beveling the sharpened leading edges 33 on two sides of the disc 24C, the disc 24C can be used on either the right or left side of the debris clearing apparatus 11.

Figure 13:
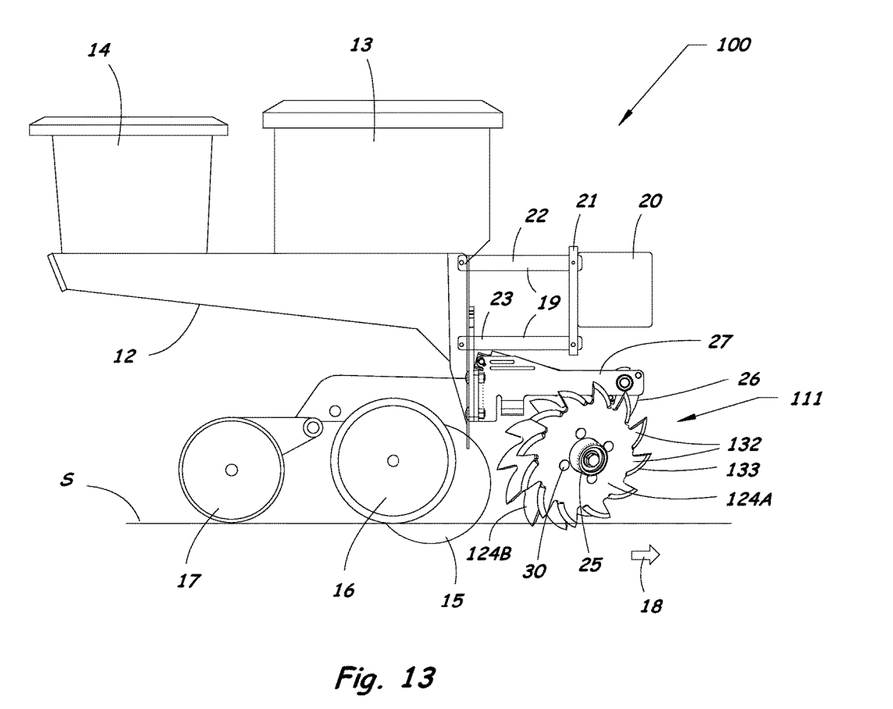
FIG. 13 is a right side elevation view of a planter row unit equipped with a debris clearing apparatus according to another embodiment of the present invention.
Figure 14:
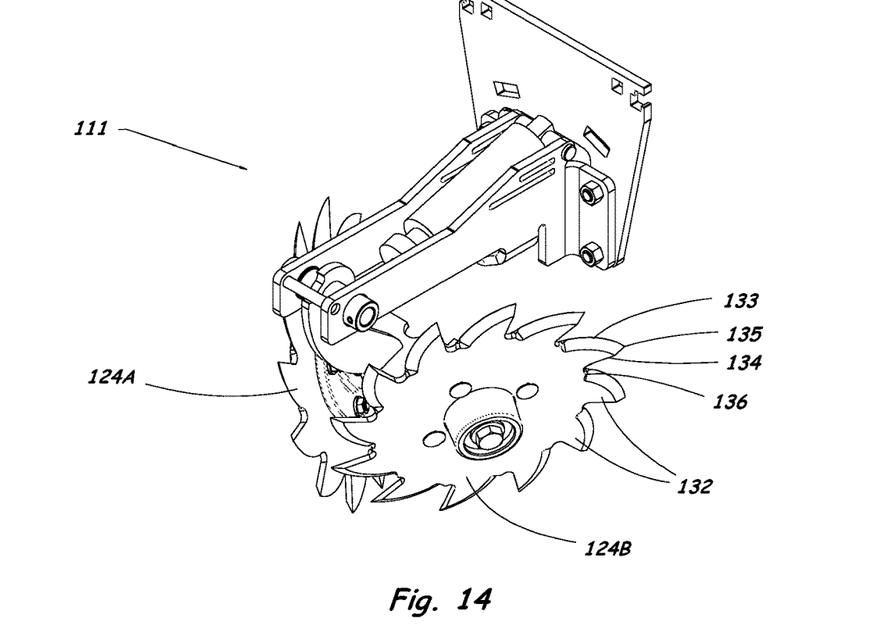
FIG. 14 is a perspective view of the debris clearing apparatus shown in FIG. 13.
Figure 15:
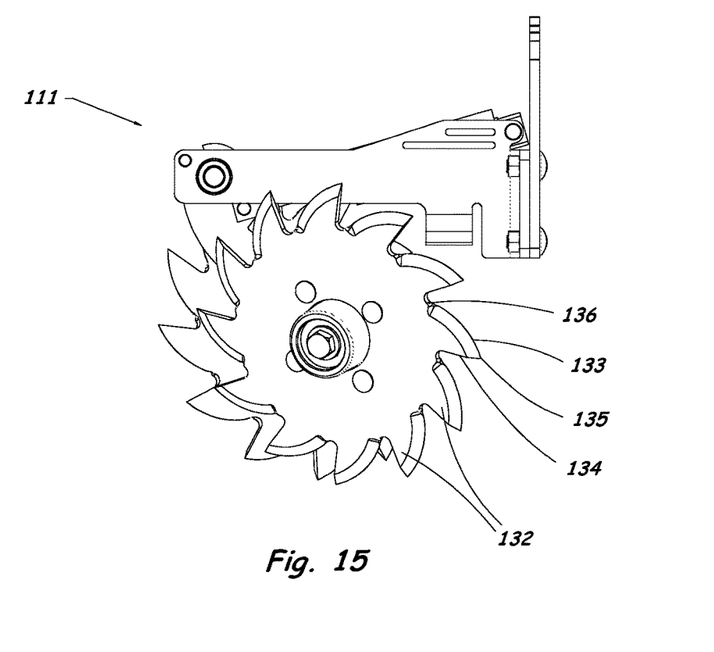
FIG. 15 is a left side elevation view of the debris clearing apparatus shown in FIG. 14.

FIGS. 13 to 27 illustrate another embodiment of the debris clearing apparatus 111 of the present invention. A planter row unit 100 equipped with the debris clearing apparatus 111 is illustrated in FIG. 13. The planter row unit 100 and the debris clearing apparatus 111 are the same as the planter row unit 10 and debris clearing apparatus 11 described above and illustrated in FIGS. 1 to 9, except that the discs 124 in the debris clearing apparatus 111 are different than the discs 24 in the debris clearing apparatus 11. The same reference numerals are used in FIGS. 1 and 13 to refer to the common features of the planter row units 10 and 100.

The discs 124A, 124B of the debris clearing apparatus 111 each have a first side and an opposing second side. A plurality of teeth 132 extend from a periphery of each disc 124A, 124B. In the illustrated embodiment, each disc 124A, 124B has 12 teeth equally spaced around the disc at 30-degree intervals.

Figure 16:
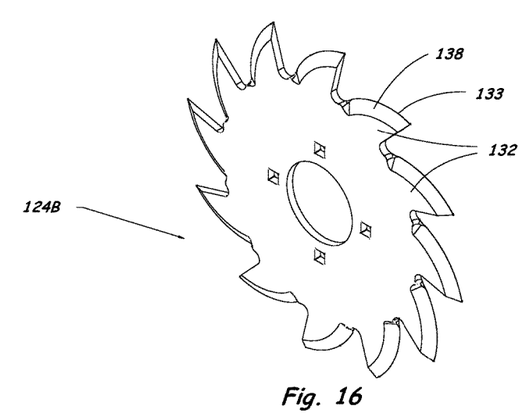
FIG. 16 is a perspective view of a left hand disc of the debris clearing apparatus shown in FIG. 14.
Figure 20:
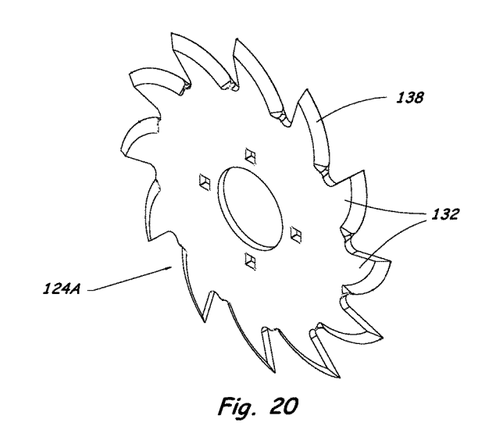
FIG. 20 is a perspective view of a right hand disc of the debris clearing apparatus shown in FIG. 14.

It will be understood that the discs 124A and 124B are basically the same as each other, except that the beveled surfaces 138 of the teeth 132 (described below) are formed on the opposite side of the disc 124A as compared to disc 124B. Accordingly, the discs 124A, 124B will be described interchangeably herein by simply referring to them as discs 124.

Figure 17:
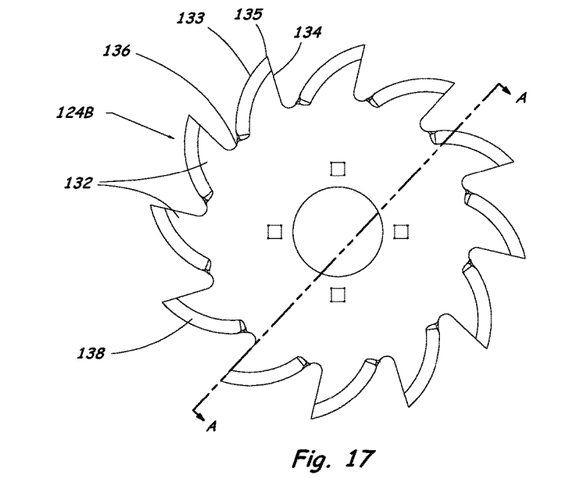
FIG. 17 is a plan view of the left hand disc shown in FIG. 16.
Figure 18:
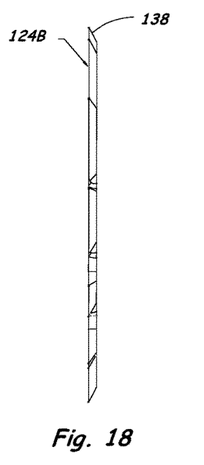
FIG. 18 is an edge view of the left hand disc shown in FIG. 16.
Figure 19:
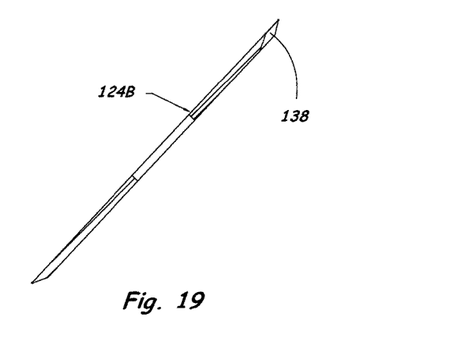
FIG. 19 is a cross section view of the left hand disc, as viewed along the line A-A in FIG. 17.
Figure 21:
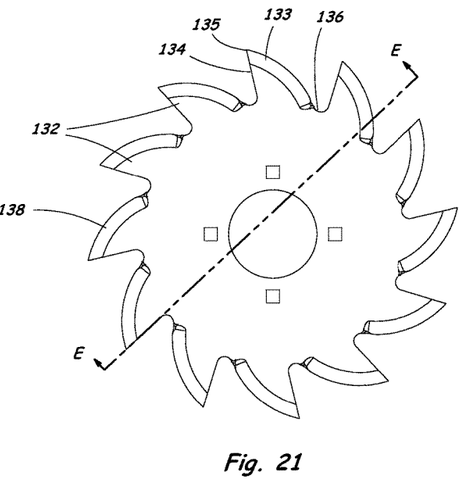
FIG. 21 is a plan view of the right hand disc shown in FIG. 20.
Figure 22:
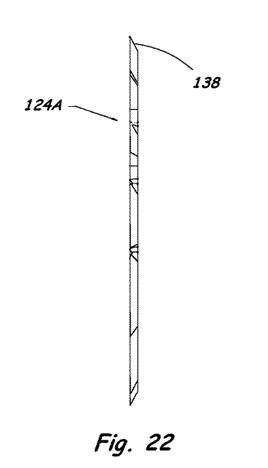
FIG. 22 is an edge view of the right hand disc shown in FIG. 20.
Figure 23:
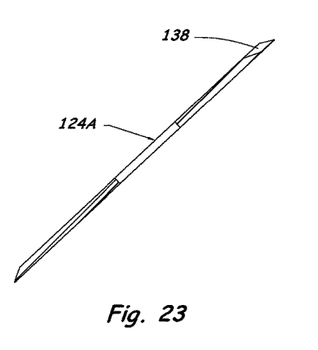
FIG. 23 is a cross section view of the right hand disc, as viewed along the line E-E in FIG. 21.
Figures 24, 26:
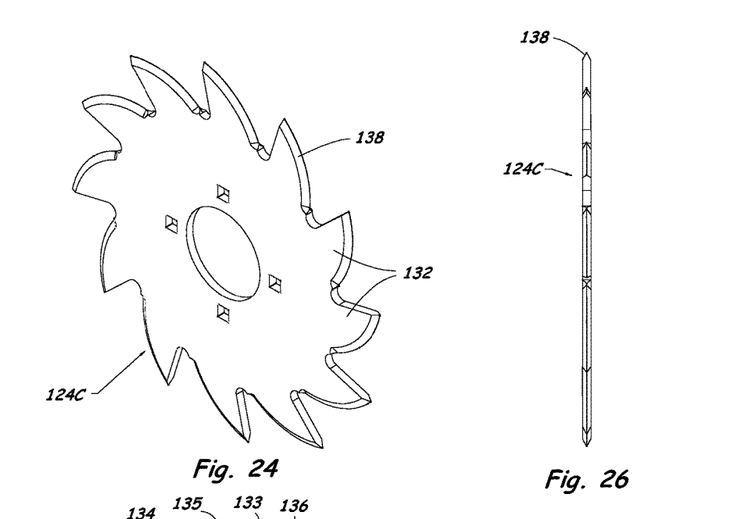
FIG. 24 is a perspective view of a double-edged disc that can be used in the debris clearing apparatus shown in FIG. 14.
FIG. 26 is an edge view of the double-edged disc shown in FIG. 24.
Figures 25, 27:
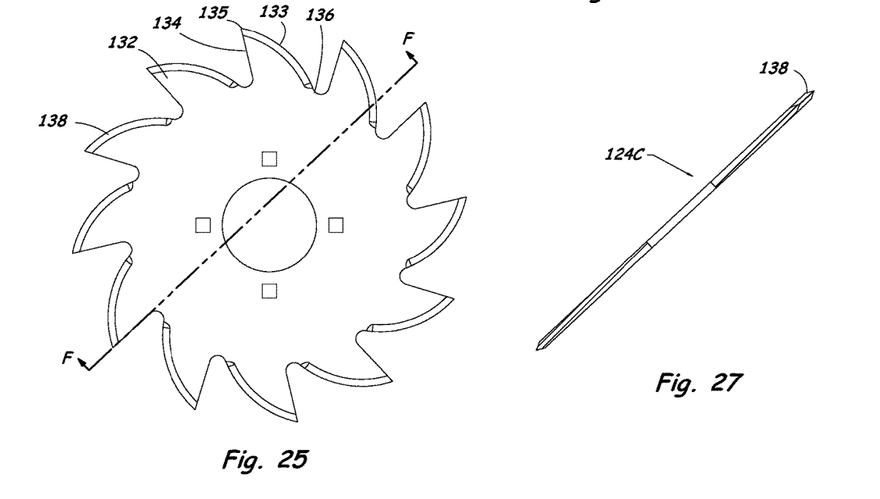
FIG. 25 is a plan view of the double-edged disc shown in FIG. 24.
FIG. 27 is a cross section view of the double-edged disc, as viewed along the line F-F in FIG. 25.

The teeth 132 on the discs 124 each have a profile comprising a curved, convex leading edge 133, and a concave trailing edge 134. The leading edge 133 and trailing edge 134 intersect with each other to form the outer distal tip 135 of each tooth 132. The outer distal tip 135 is a sharp point located at the intersection between the leading edge 133 and trailing edge 134 of each tooth 132. The sharp point 135 between the leading and trailing edges 133, 134 provides an aggressive cutting and clearing action and residue movement during operation, particularly at higher operating speeds.

The leading edge 133 of each tooth 132 is sharpened to create a leading cutting edge. By having the leading edge 133 sharpened, the teeth 132 will efficiently and effectively cut crop residue and other debris at any depth of operation up to the base 136 of the teeth 132.

The leading edges 133 of the teeth 132 in the embodiment shown in FIGS. 13 to 23 are sharpened by beveling from only one side of the disc 124. The leading edges 133 can be beveled, for example, at an angle of approximately 30 to 60 degrees relative to a plane of the disc 124. The beveled surfaces 138 are preferably on the side of the discs 124 facing away from each other.

The leading edges 133 of each tooth 132 slope rearwardly relative to a direction of rotation of the disc 124 and a radial line passing through the tooth 132. The rearward slope of the leading edges 133 increases from the base 136 of the tooth 132 to the distal tip 135 of each tooth 132 due to the convex curvature of the leading edge 133. The sharpened leading edges 133 of the teeth 132 have been determined to improve the ability of the teeth 132 to cut through crop residue and other debris. The trailing edges 134 of the teeth 132 are straight and extend generally in a radial direction with a slightly rearward slope relative to a direction of rotation to encourage the crop residue and soil to fall off of the teeth 132 during operation.

FIGS. 24 to 27 show a double-edged disc 124C that can be use instead of the discs 124A, 124B in the debris clearing apparatus 111. The leading edges 133 of the teeth 132 of the double-edged disc 124C are sharpened by beveling from two sides of the disc 124C. The leading edges 133 can be beveled, for example, from both sides of the disc 124C at an angle of approximately 30 to 60 degrees relative to a plane of the disc 124C. By beveling the sharpened leading edges 133 from two sides of the disc 124C, the disc 124C can be used on either the right or left side of the debris clearing apparatus 111.

As used in this application, the term "leading edge" is intended to mean that portion of the tooth of a disc that provides the leading surface of the tooth relative to the path of rotation of the disc when the disc is rotating in a normal direction of operation as the implement is moving in a forward direction through a field. The "leading edge" should have a substantial radial component so that the sharpened leading edge can extend a substantial distance from the base of the tooth to the distal tip of the tooth for improved cutting action across a substantial depth as the teeth penetrate the soil. The "leading edge" is not intended to mean an outer edge of the tooth or other portion of the disc that extends primarily in a circumferential direction of the disc.

As used in this application, the term "sharpened" is intended to mean an edge that has been beveled from at least one side to form a sharp edge or a relatively thin blunt edge between two opposing flat surfaces of a disc. A sharpened edge is not intended to include a blunt edge of a flat disc that has not been beveled on either side.

It should also be appreciated that other edges of the discs could also be sharpened without departing from the scope of the present invention. For example, the outer edges or trailing edges of the teeth could be sharpened to further enhance the ability of the teeth to cut through residue or clear residue during operation.

The debris clearing apparatus of the present invention has been illustrated with two substantially flat discs arranged in a V-shaped configuration with the discs toed-in toward each other in a direction of forward movement. This allows a pair of discs to clear an area (e.g., a narrow strip for planting or fertilizing), with the discs moving the debris to each side of the cleared area. However, it should be appreciated that other configurations are also possible. For example, a single debris clearing disc can be used to clear an area, in which case the debris will be moved by the single disc to one side of the cleared area. For another example, the discs can be concave or dished, instead of substantially flat, to accommodate certain crop conditions in which a more aggressive turning of the soil is desired.

While the invention has been specifically described in connection with specific embodiments thereof, it is to be understood that this is by way of illustration and not of limitation, and the scope of the appended claims should be construed as broadly as the prior art will permit.

What is claimed is:

1. A debris clearing apparatus for use with an agricultural implement, said debris clearing apparatus clearing debris in its path with minimal disturbance of the soil surface in a no till or low till operation, said apparatus comprising:

one or more rotatable discs, each disc including a plurality of teeth extending from a periphery thereof, each tooth having an outer edge and a base and a radial length between said outer edge and said base, each tooth having opposed sides and a profile comprising a leading edge and a trailing edge;

said leading edge of each tooth being sharpened to create a leading cutting edge, said leading cutting edge of each tooth has a sharpened straight edge beveled from only one of said opposed sides and extending from said base of each tooth to a distal tip of each tooth;

substantially said entire radial length of each tooth is exposed for cutting debris and not penetrating the soil, only a small portion of said radial length adjacent said outer edge is capable of penetrating the soil;

whereby said debris clearing apparatus cuts through and clears debris up to said base of each tooth with minimal to no penetration of the soil.

2. The debris clearing apparatus according to claim 1, wherein said one or more rotatable discs include a first disc and a second disc positioned with respect to each other in a V-shape configuration with the discs toed-in toward each other in a direction of travel so that a geometric plane containing the first disc intersects a geometric plane containing the second disc.

3. The debris clearing apparatus according to claim 1, wherein said plurality of teeth comprise 12 teeth on each disc, said teeth being equally spaced around said first and second discs at 30 degrees intervals.

4. The debris clearing apparatus according to claim 1, wherein said leading edge of each tooth slopes rearwardly relative to a direction of rotation of each disc and a radial line passing through the tooth.

5. The debris clearing apparatus according to claim 1, wherein each tooth has an outer edge extending between said leading edge and said trailing edge.

6. The debris clearing apparatus according to claim 5, wherein the outer edge of each tooth extends at an obtuse angle relative to the leading edge thereof.

7. The debris clearing apparatus according to claim 5, wherein a sharpened point of intersection is formed where the leading cutting edge of each tooth intersects with the outer edge thereof.

8. The debris clearing apparatus according to claim 5, wherein a transition between the leading cutting edge and the outer edge of each tooth is abrupt.

9. The debris clearing apparatus according to claim 5, wherein a convex vertex is formed between the leading cutting edge and the outer edge of each tooth.

10. The debris apparatus according to claim 5, wherein the outer edges of the teeth are circumferential with each disc and have a radius of curvature equal to a radius of the disc.

11. The debris clearing apparatus according to claim 1, wherein said leading edges of the teeth of each disc are sharpened by beveling the disc at an angle of approximately 30 to 60 degrees.

12. The debris clearing apparatus according to claim 1, wherein said leading edge of each tooth comprises a curved edge extending from a base of the tooth to a distal tip of the tooth.

13. The debris clearing apparatus according to claim 12, wherein said leading edge of each tooth slopes rearwardly relative to a direction of rotation of each disc and a radial line passing through the tooth, and wherein the rearward slope of the leading edge increases toward the distal tip of the tooth.

14. The debris clearing apparatus according to claim 12, wherein said leading cutting edge of each tooth intersects with the trailing edge thereof to form a sharpened point of intersection at the distal tip of the tooth.

15. The debris clearing apparatus according to claim 12, wherein said leading edges of the teeth are sharpened by beveling at an angle of approximately 30 to 60 degrees.

16. The debris clearing apparatus according to claim 1, wherein each disc is substantially flat.

17. A debris clearing device, said debris clearing apparatus clearing debris in its path with minimal disturbance of the soil surface, said debris clearing device comprising:

a rotatable disc having a plurality of teeth extending from a periphery of said disc, each tooth having opposed sides and a distal tip and a base and a radial length between said distal tip and said base, each tooth having a profile comprising a leading edge and a trailing edge; and said leading edge of each tooth being sharpened to create a leading cutting edge; said leading cutting edge of each tooth has a sharpened straight edge beveled from only one of said opposed sides and extending from said base of the tooth to a distal tip of the tooth;

substantially said entire radial length of each tooth is exposed for cutting debris and not penetrating the soil, only a small portion of said radial length adjacent said outer edge is capable of penetrating the soil;

whereby said debris clearing apparatus cuts through and clears debris up to said base of each tooth with minimal to no penetration of the soil.

18. The debris clearing apparatus according to claim 17, wherein the leading edge of each tooth slopes rearwardly relative to a direction of rotation of said disc and a radial line passing through the tooth.

19. The debris clearing apparatus according to claim 17, wherein said leading edges of the teeth are sharpened an angle of approximately 30 to 60 degrees.

20. The debris clearing device according to claim 17, wherein said leading edge of each tooth comprises a straight edge extending from a base of the tooth to said distal tip of the tooth.

21. The debris clearing device according to claim 20, wherein each tooth has an outer edge extending between said leading edge and said trailing edge.

22. The debris clearing device according to claim 21, wherein a sharp point of intersection is formed where the leading cutting edge of each tooth intersects with the outer edge thereof.

23. The debris clearing device according to claim 21, where in the outer edges of the teeth are circumferential with the disc and have a radius of curvature equal to a radius of the disc.

24. The debris clearing device according to claim 17, wherein said leading edge of each tooth comprises a curved edge extending from a base of the tooth to said distal tip of the tooth.

25. The debris clearing device according to claim 24, wherein the leading cutting edge of each tooth intersects with the trailing edge thereof to form a sharp point of intersection at said distal tip of the tooth.

26. The debris clearing device according to claim 17, wherein said disc is substantially flat.

* * * * *